(12) United States Patent
van Cleeff

(10) Patent No.: US 6,169,139 B1
(45) Date of Patent: Jan. 2, 2001

(54) FLUOROELASTOMER LATEX

(75) Inventor: Albertus van Cleeff, Wilmington, DE (US)

(73) Assignee: DuPont Dow Elastomers LLC, Wilmington, DE (US)

(*) Notice: Under 35 U.S.C. 154(b), the term of this patent shall be extended for 0 days.

(21) Appl. No.: 09/257,925

(22) Filed: Feb. 26, 1999

Related U.S. Application Data

(60) Provisional application No. 60/083,117, filed on Apr. 27, 1998.

(51) Int. Cl.$^7$ ................................................ C08L 27/12
(52) U.S. Cl. ................................................ 524/544
(58) Field of Search ................................ 524/544

(56) References Cited

U.S. PATENT DOCUMENTS

| | | | |
|---|---|---|---|
| 3,051,677 | 8/1962 | Rexford | 260/29.6 |
| 3,331,823 | 7/1967 | Sianesi et al. | 260/87.7 |
| 3,467,635 | 9/1969 | Brasen et al. | 260/80.76 |
| 3,886,108 | 5/1975 | Snow, Jr. | 260/29.6 |
| 3,962,169 | 6/1976 | Arruda et al. | 260/29.6 |
| 4,232,126 * | 11/1980 | Marquisee | 521/65 |
| 4,281,092 | 7/1981 | Breazeale | 526/247 |
| 4,320,216 * | 3/1982 | Apotheker | 526/248 |
| 4,335,238 | 6/1982 | Moore et al. | 526/254 |
| 4,503,179 | 3/1985 | Yoshimura et al. | 524/262 |
| 4,524,197 * | 6/1985 | Khan | 526/206 |
| 4,654,235 | 3/1987 | Effenberger et al. | 427/407.3 |
| 5,194,335 * | 3/1993 | Effenberger | 428/421 |
| 5,219,927 | 6/1993 | Moggi et al. | 525/54.3 |
| 5,230,937 * | 7/1993 | Effenberger | 428/113 |
| 5,719,245 | 2/1998 | Yamamoto et al. | 526/247 |
| 5,789,489 | 8/1998 | Coughlin et al. | 525/370 |
| 5,789,509 | 8/1998 | Schmiegel | 526/247 |
| 5,852,149 * | 12/1998 | Abusleme | 526/247 |
| 5,854,342 | 12/1998 | Kirochko et al. | 524/805 |
| 5,925,705 | 7/1999 | Araki et al. | 524/462 |

* cited by examiner

*Primary Examiner*—Paul R. Michl

(57) ABSTRACT

A fluoroelastomer latex is produced that is capable of forming films having excellent water resistance. In a first step, polymerization of fluorinated monomers is carried out in the presence of fluorinated surfactants at a pH of 3–8. The pH of the resultant fluoroelastomer emulsion composition is then adjusted to 5–9 and the emulsion is concentrated to yield a solids-rich latex.

9 Claims, No Drawings

FLUOROELASTOMER LATEX

REFERENCE TO RELATED APPLICATION

This application claims the benefit of U.S. Provisional Application No. 60/083117 filed Apr. 27, 1998.

FIELD OF THE INVENTION

This invention relates to fluoroelastomer latices capable of producing films having reduced water sensitivity and to a process for preparation of such latices.

BACKGROUND OF THE INVENTION

Elastomeric fluoropolymers (i.e. fluoroelastomers) exhibit excellent resistance to the effects of heat, weather, oil, solvents and chemicals. As a consequence, compositions that contain fluoroelastomers as major components have found utility as protective coatings for substrates such as fabrics, fibers, metals, and plastics. In some applications, the fluoroelastomer coating compositions are applied to substrates in the form of thin surface veneers, while in other applications the substrates are impregnated to a significant depth. For example, the use of fluoroelastomer coatings in protecting and consolidating lapideous compositions is disclosed in U.S. Pat. No. 5,219,927. Protective coatings for textiles are disclosed in U.S. Pat. No. 4,654,235.

Fluoroelastomer coating compositions are generally of two types, organic solvent-based systems or water-based systems. The former can be prepared by a process wherein a substantially dry fluoroelastomer gum is dissolved in a solvent such as methyl ethyl ketone or methyl isobutyl ketone. In contrast, water-based coating compositions, i.e. latices, are not usually prepared directly from fluoroelastomer gums because of the difficulty of forming a stable aqueous composition from the substantially dry gum. Instead, fluoroelastomer latices are generally prepared by either of two multistep methods. According to the first method, a fluoroelastomer gum is dissolved in a suitable organic solvent. The resulting solution is then mixed with an aqueous solution containing stabilizers, such as surfactants, and the organic solvent is then removed. Such a process is described in U.S. Pat. No. 3,886,108. In the second method, the latex is prepared directly by polymerizing fluorinated monomers in an aqueous emulsion or suspension process. Such a process is disclosed in U.S. Pat. No. 3,962,169.

Although preparation of organic solvent-based coating and adhesive compositions is relatively simple and inexpensive, organic solvent solutions present significant safety and environmental hazards due to the flammability and volatility of the solvents employed. Preparative methods for fluoroelastomer latices that rely on dissolution in organic solvents as a first step suffer from these same disadvantages.

The preferred method for preparation of fluoroelastomer latices is by direct polymerization using a batch, semi-batch or continuous process. Regardless of the method used, the goal is to produce a latex which forms a continuous, pinhole-free film when applied to a substrate. Further, the film will preferably contain the minimum quantity of non-polymeric species. Impurities, such as traces of surfactants and inorganic salts, often remain in films formed from latices and such impurities can cause poor water resistance of the films. For example, films formed at room temperature can absorb over 3 wt. % of water upon immersion. The presence of impurities is a particular problem in situations where the final product cannot be heated to high temperatures to drive off volatile, water sensitive species. There is thus a clear need for an improved fluoroelastomer latex product having lower levels of impurities and consequently less water sensitivity.

SUMMARY OF THE INVENTION

The present invention is directed to a process for preparation of a fluoroelastomer latex which is useful for forming films having improved water resistance and adhesion to a coated substrate.

In particular, the present invention is directed to a process for preparation of a fluoroelastomer latex which comprises the steps of:
A) forming an aqueous emulsion of monomers capable of being copolymerized to form a fluoroelastomer, said emulsion comprising
   1) a first monomer selected from the group consisting of vinylidene fluoride and tetrafluoroethylene,
   2) at least one other fluorine-containing monomer,
   3) a free radical initiator in an amount which catalyzes the free radical emulsion polymerization of said monomers,
   4) from about 0.05–3.0 parts by weight per hundred parts monomer of a fluorinated surfactant, and
   5) sufficient base to adjust the pH of said emulsion to between 3 to 8;
B) polymerizing said emulsion at a temperature of about 40–130° C. and a pressure of about 2–9 MPa to form a fluoroelastomer emulsion composition;
C) adding a sufficient amount of base to adjust the pH of said fluoroelastomer emulsion composition to between 5–9; and
D) concentrating said fluoroelastomer emulsion composition which has a pH of 5–9 to form a solids-rich fluoroclastomer latex.

The invention is further directed to a fluoroelastomer latex produced by a process which comprises the steps of
A) forming an aqueous emulsion of monomers capable of being copolymerized into a fluoroelastomer, said emulsion comprising
   1) a first monomer selected from the group consisting of vinylidene fluoride and tetrafluoroethylene,
   2) at least one other fluorine-containing monomer,
   3) a free radical initiator in an amount which catalyzes the free radical emulsion polymerization of said monomers,
   4) from about 0.05–3.0 parts by weight per hundred parts monomer of a fluorinated surfactant, and
   5) sufficient base to adjust the pH of said emulsion to between 3–8;
B) polymerizing said aqueous emulsion at a temperature of about 40°–130° C. and a pressure of about 2–9 MPa to form a fluoroelastomer emulsion composition,
C) adding a sufficient amount of base to adjust the pH of said fluoroelastomer emulsion composition to between 5–9; and
D) concentrating said fluoroelastomer emulsion composition which has a pH of 5–9 to form a solids-rich fluoroelastomer latex.

In preferred embodiments of the invention a second surfactant is added to the fluoroelastomer emulsion composition to further stabilize the composition. This addition may take place prior to addition of base to adjust the pH of the fluoroelastomer emulsion composition (Step C) above). Alternatively, the additional surfactant may be added after adjustment of pH as well as after concentrating the fluoroelastomer emulsion.

In other preferred embodiments of the invention the concentration step is carried out by use of a creaming agent.

DETAILED DESCRIPTION OF THE INVENTION

According to the present invention, solids-rich fluoroelastomer latices that can be used to form coating compositions of excellent quality, in particular having reduced water sensitivity, are prepared via a process which comprises polymerization, pH adjustment of the thus-prepared fluoroelastomer emulsion, and concentration of the emulsion to form a solids-rich latex composition. By "reduced water sensitivity" and "water resistance" is meant that films of 21 mils thickness or less made from the latices of this invention absorb less than 2 wt. % water when said films are immersed in water for 48 hours at 25° C.

In the first step of the process of an embodiment of the present invention an aqueous emulsion of at least two monomers is formed. The first monomer is selected from the group consisting of vinylidene fluoride and tetrafluoroethylene. At least one other fluorinated monomer is also present in the emulsion. The emulsion is generally formed by introduction of gaseous monomers and water into a reaction vessel.

Examples of common fluorinated monomers which are copolymerizable with vinylidene fluoride to form fluoroelastomers and which are useful in the practice of the invention include hexafluoropropylene, chlorotrifluoroethylene, 2-hydropentafluoropropene, 1-hydropentafluoropropene, dichlorodifluoroethylene, tetrafluoroethylene and perfluorinated alkyl vinyl ethers, for example trifluoromethyl trifluorovinyl ether, pentafluoroethyl trifluorovinyl ether, and heptafluoropropyl trifluorovinyl ether. It is preferable that the fluorinated monomer capable of copolymerization with vinylidene fluoride contain at least as many fluorine atoms as carbon atoms. Elastomeric copolymers of vinylidene fluoride and hexafluoropropylene are described in U.S. Pat. No. 3,051,677. Elastomeric copolymers of vinylidene fluoride and pentafluoropropenes are described in U.S. Pat. No. 3,331,823.

Examples of fluorinated monomers which are copolymerizable with tetrafluoroethylene to form fluoroelastomers include perfluoro(alkyl vinyl) ethers, vinylidene fluoride and 2-hydropentafluoropropene. Elastomeric copolymers of tetrafluoroethylene, trifluoromethyl trifluorovinyl ether, chlorotrifluoroethylene, and 2-hydropentafluoropropene are disclosed in U.S. Pat. No. 5,719,245.

In addition to the fluorinated monomers, copolymerizable non-fluorinated comonomers may also be present. The fluoroelastomer emulsion produced during polymerization will then be an emulsion of a higher order elastomeric copolymer, such as a terpolymer or tetrapolymer. Examples of suitable copolymerizable non-fluorinated comonomers include ethylene and propylene.

An example of a fluoroelastomer terpolymer containing only fluorinated comonomers that may be prepared as an emulsion according to the process of the present invention is a copolymer of vinylidene fluoride, hexafluoropropylene, and tetrafluoroethylene. Examples of fluoroelastomer terpolymers containing non-fluorinated monomers that may be prepared as emulsions according to the invention include copolymers of vinylidene fluoride, tetrafluoroethylene, and propylene and copolymers of ethylene, tetrafluoroethylene and trifluoromethyl trifluorovinyl ether.

The fluoroelastomer copolymers of this invention may also include any cure site monomer commonly used in fluoroelastomers, including but not limited to a brominated or iodinated olefin. Examples of such olefins include 4-bromotetrafluorobutene-1, bromotrifluoroethylene, 4-iodotetrafluorobutene-1, and iodotrifluoroethylene.

The process of the invention is also suitable for use in the preparation of perfluoroelastomer latices. That is, the polymeric component of the latex may be a copolymer of tetrafluoroethylene, at least one other perfluorinated compound and, generally, a small amount of a perfluorinated or non-perfluorinated cure site monomer.

Examples of perfluorinated comonomers which may be polymerized with tetrafluoroethylene to form perfluoroelastomers include perfluoro(alkyl vinyl) ethers, for example trifluoromethyl trifluorovinyl ether and heptafluoropropyl trifluorovinyl ether. Suitable perfluorinated vinyl ethers are those of the formula $$CF_2=CFO(R_fO)_n(R_{f'}O)_mR_f \qquad (I)$$

where $R_f$ and $R_{f'}$ are different linear or branched perfluoroalkylene groups of 2–6 carbon atoms, m and n are independently 0–10, and $R_f$ is a perfluoroalkyl group of 1–6 carbon atoms.

A preferred class of perfluoro(alkyl vinyl) ethers includes compositions of the formula $$CF_2=CFO(CF_2CFXO)_nR_f \qquad (II)$$

where X is F or $CF_3$, n is 0–8, and $R_f$ is a perfluoroalkyl group of 1–6 carbon atoms.

Most preferred perfluoro(alkyl vinyl) ethers are those wherein n is 0 or 1 and $R_f$ contains 1–3 carbon atoms. Examples of such perfluorinated ethers include trifluoromethyl trifluorovinyl ether and heptafluoropropyl trifluorovinyl ether. Other useful monomers include compounds of the formula $$CF_2=CFO[(CF_2)_mCF_2CFZO]_nR_f \qquad (III)$$

where $R_f$ is a perfluoroalkyl group having 1–6 carbon atoms, m=0 or 1, n=0–5, and Z=F or $CF_3$.

Preferred members of this class are those in which $R_f$ is $C_3F_7$, m=0, and n=1. Additional perfluoro(alkyl vinyl) ether monomers include compounds of the formula $$CF_2=CFO[(CF_2CFCF_3O)_n(CF_2CF_2CF_2O)_m(CF_2)_p]C_xF_{2x+1} \qquad (IV)$$

where m and n=1–10, p=0–3, and x=1–5.

Preferred members of this class include compounds where n=0–1, m=0–1, and x=1

Examples of useful perfluoro(alkoxy vinyl) ethers include $$CF_2=CFOCF_2CF(CF_3)O(CF_2O)_mC_nF_{2n+1} \qquad (V)$$

where n=1–5, m=1–3, and where, preferably, n=1.

Mixtures of perfluoro(alkyl vinyl) ethers and perfluoro(alkoxy vinyl) ethers may also be used.

Preferred copolymers are composed of tetrafluoroethylene and at least one perfluoro(alkyl vinyl) ether as principal monomer units. In such copolymers, the copolymerized perfluorinated ether units constitute from about 15–50 mole percent of total monomer units in the polymer.

The copolymers of tetrafluoroethylene and perfluoro(alkyl vinyl) ethers useful in the practice of the present invention generally also contain copolymerized units of at least one cure site monomer, usually in amounts of from 0.1–5 mole percent. The range is preferably between 0.3–2.0 mole percent. Although more than one type of cure site monomer may be present, most commonly one cure site monomer is used and it contains at least one nitrile substituent group. Suitable cure site monomers include nitrile-containing fluorinated olefins and nitrile-containing fluorinated vinyl ethers. Useful nitrile-containing cure site monomers include those of the formulas shown below.

$$CF_2=CF-O(CF_2)_n-CN \quad (VI)$$

where n=2–12, preferably 2–6;

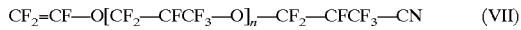

$$CF_2=CF-O[CF_2-CFCF_3-O]_n-CF_2-CFCF_3-CN \quad (VII)$$

where n=0–4, preferably 0–2; and

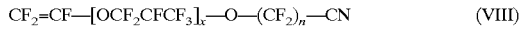

$$CF_2=CF-[OCF_2CFCF_3]_x-O-(CF_2)_n-CN \quad (VIII)$$

where x=1–2, and n=1–4.
Those of formula (VIII) are preferred. Especially preferred cure site monomers are perfluorinated polyethers having a nitrile group and a trifluorovinyl ether group. A most preferred cure site monomer is

$$CF_2=CFOCF_2CF(CF_3)OCF_2CF_2CN \quad (IX)$$

i.e. perfluoro(8-cyano-5-methyl-3,6-dioxa-1-octene) or 8-CNVE.

Other cure site monomers include olefins represented by the formula $R_1CH=CR_2R_3$, wherein $R_1$ and $R_2$ are independently selected from hydrogen and fluorine and $R_3$ is independently selected from hydrogen, fluorine, alkyl, and perfluoroalkyl. The perfluoroalkyl group may contain up to about 12 carbon atoms. However, perfluoroalkyl groups of up to 4 carbon atoms are preferred. In addition, the cure site monomer preferably has no more than three hydrogen atoms. Examples of such olefins include ethylene, vinylidene fluoride, vinyl fluoride, trifluoroethylene, 1-hydropentafluoropropene, and 2-hydropentafluoropropene, as well as brominated olefins such as 4-bromo-tetrafluorobutene-1 and bromotrifluoroethylene and iodinated olefins such as 4-iodotetrafluorobutene-1 and iodotrifluoroethylene.

An especially preferred perfluoroelastomer contains 53.0–79.9 mole percent tetrafluoroethylene, 20.0–46.9 mole percent trifluoromethyl trifluorovinyl ether and 0.4 to 1.5 mole percent nitrile-containing cure site monomer.

The fluoroelastomers are prepared by free radical polymerization in an emulsion system in the presence of a free radical initiator. The most common free-radical initiators are 1) water soluble ammonium or potassium persulfate or 2) the redox system potassium persulfate and sodium sulfite. The initiator catalyzes the polymerization reaction and is generally present in amounts sufficient to give a radical flux of from 5 to 100 mmol/kg polymer. It is possible to minimize ionic end group concentrations by conducting the polymerization in the presence of low levels of chain transfer agents. Hydrocarbon-based alcohols, esters and halogens as well as various iodinated compounds, including diiodomethane, and fluoroalkyl iodides have been used successfully. Chain transfer agents which are not perfluorinated can be used in the polymerization reaction to introduce desirable fragments into the polymer chain for curing purposes, and are considered cure site moieties. Such agents include diiodo compounds that result in bound iodine, commonly at the end of the polymer chains. Preparative techniques for the fluoroelastomers and perfluoroelastomers are described in general in Logothetis, *Prog. Polymn. Sci*, Vol. 14, 251–296 (1989) and in U.S. Pat. Nos. 4,281,092; 5,789,489; and 5,789,509.

In a further embodiment of the invention, the aqueous emulsion formed in the first step contains copolymers of tetrafluoroethylene and olefins. That is, the copolymer contains only a single fluorinated monomer, i.e. tetrafluoroethylene, rather than at least two fluorinated monomers. Particularly useful copolymers are those disclosed in Brasen et al. in U.S. Pat. No. 3,467,635 having copolymerized tetrafluoroethylene units and olefin units in the mole ratio of about 1:0.6–1.2 with the olefin units being selected from (1) 50–100 mole percent of units of propylene, butene-1, and mixtures thereof and with the remainder of the olefin units being selected from 0 to 50 mole percent ethylene or isobutylene and (2) ethylene and isobutylene in about 1:1 molar proportion. The fluorine content of the elastomers is at least 45 weight percent. Elastomeric tetrafluoroethylene/propylene copolymers are of particular interest.

A particular feature of the invention is the presence of from about 0.05–3.0 parts of a fluorinated surfactant per hundred parts monomer in the polymerization mixture. Fluorosurfactants which may be used include acids of the formula $X(CF_2)_nCOOH$, where n is an integer in the range of 6–20 and X is hydrogen or fluorine. Alkali metal salts of such acids are also effective surfactants. In addition, ammonium, amine, and quaternary ammonium salts of such acids are also useful. Examples of such compositions include ammonium perfluorooctanoate, available from 3M Company as Fluorad® FC-143 surfactant. Other useful carboxylate-type surfactants are described by the general formula $R_fCH_2CH_2SCH_2CH_2COOM$, where $R_f=F(CF_2CF_2)_x$, with X=1 to about 9, and M is ammonium, lithium, sodium or potassium; the lithium salt is available from E. I. du Pont de Nemours and Co. under the name Zonyl® FSA fluorinated surfactant. Phosphoric acid esters of perfluoroalkanols of the formula $(R_fCH_2CH_2O)xP(O)(ONH_4)_y$ where $R_f=F(CF_2CF_2)z$ with x=1 or 2, y=2 or 1, x+y=3, and z=1 to about 7, available under the trade name Zonyl® FSP fluorosurfactant. This type of surfactant is also available in the acid form (i.e. the $(ONH_4)_y$ groups are replaced by $(OH)_y$ groups) under the trade name Zonyl® UR fluorosurfactant, from which the ammonium, lithium, sodium and potassium salts can be prepared by neutralization with the respective bases.

Sulfuric acid esters of polyfluoroalkanols of the formula $R_fCH_2CH_2SO_3X$, where $R_f=F(CF_2CF_2)y$, y=1 to about 9, X=H or $NH_4$, lithium, sodium, or potassium may also be used as fluorosurfactants. An example of such a fluorosurfactant where X is H or $NH_4$ is Zonyl® TBS fluorosurfactant, available from E. I. du Pont de Nemours and Co.

In general, it is preferred to use from 0.05–0.5 parts of fluorosurfactant per 100 parts monomer present because at higher levels undesirably high levels of foam may be generated, requiring the use of defoaming agents.

A second important feature of the process of the invention is that the pH of the polymerization reaction mixture must be maintained in the range of from 3–8, preferably from 5–8, especially in the case where fluorosurfactants are used that are based on weak acids, for example Zonyl® UR fluorosurfactant. Bases that may be used to adjust the pH include sodium hydroxide, lithium hydroxide, potassium hydroxide, and ammonium hydroxide. Ammonium hydroxide is a preferred base because little or no foaming results during isolation of the fluoroelastomer emulsion when ammonium hydroxide is used. That is, the aqueous elastomer composition exiting the polymerization reactor may contain unreacted gaseous monomers that are soluble in the composition while it is under pressure. When the pressure is lowered, as the composition exits the reactor, some monomer will volatize out of the polymer. The type and amount of surfactant used, the pH of the composition, and the type of base or buffer utilized to adjust the pH of the reaction mixture are all factors that influence whether undesirable amounts of foam may result. Foaming may be prevented or reduced by adjustment of these variables. Alternatively, a defoaming agent may either be added to the aqueous elastomer composition while it is still under elevated pressure or after the pressure is reduced during degassing. Common defoaming agents include silicone-based defoamers, such as those supplied by Dow Corning that consist of mixtures of various siloxanes.

The aqueous emulsion formed during the first step of the process of the invention is generally prepared in a continuous stirred tank reactor, although batch or semi-batch reactors may also be used. If the aqueous emulsion is prepared in a continuous process, aqueous solutions containing polymerization catalysts, surfactants, optional reducing agents, chain transfer agents, and buffers are added to the continuously stirred reactor. Simultaneously, monomers are fed to the reactor. Polymerization occurs, thereby resulting in production of a fluoroelastomer latex. It has been found that surfactants aid the polymerization process. In addition, the presence of surfactants fosters the production of a small particle size emulsion. A small particle size latex is desirable because it has a reduced tendency to settle. The emulsion resulting from a continuous polymerization will typically have a solids content of around 20 percent by weight. It is possible to produce an emulsion having a somewhat higher solids level through use of a semi-batch or batch process. Higher solids levels are often preferred, since the rate at which a latex dries, after it has been applied to a substrate, is dependent on the solids content of the latex. That is, the less water that is present, the faster the latex will dry to form a continuous film.

Polymerization temperatures typically range from 40°–130° C., preferably 70°–120° C., at pressures of 2 to 9 MPa and residence times of 10 to 240 minutes. A residence time of 20 to 60 minutes is preferred for vinylidene fluoride copolymers. After polymerization, unreacted monomer is removed from the reactor effluent by vaporization at reduced pressure. The resultant fluoroelastomer emulsion composition may, optionally and preferably, be further stabilized by further addition of surfactant.

The surfactant added to effect further stabilization may be the same as or different from that utilized during polymerization. Non-fluorinated surfactants as well as fluorinated surfactants may be employed at this stage. Examples of suitable surfactants include octyl and nonyl phenoxypolyethoxyethanols, such as Triton® X-100, X-305 and -705 surfactants (available from Union Carbide, Inc.); various alcohol ethoxylates, such as Neodol® 91-6, 91-8, and 25-9 surfactants (available from Shell Chemical Company) or Zonyl® FSN fluorinated surfactant (available from E. I. du Pont de Nemours and Co.); ethoxylated phosphates such as Merpol® A nonionic hydrocarbon surfactant (available from Stepan Chemical Co.); and other alcohol ethoxylates such as Merpol® SE and SH nonionic hydrocarbon surfactants (available from Stepan Chemical Co.). Fluorinated surfactants include Zonyl® FSA and Zonyl® FSP fluorinated surfactants (available from E. I. du Pont de Nemours and Co.). Combinations of fluorinated and non-fluorinated surfactants are also useful.

Following preparation of the fluoroelastomer emulsion composition, its pH is adjusted by addition of base. The base may be added before, in conjunction with, or following addition of the surfactant. That is, the order of addition of base and the optional additional surfactant is not critical. The amount of base added will be a quantity sufficient to adjust the pH of the fluoroelastomer emulsion composition to from 5–8. Inorganic or organic bases may be used, but typically sodium hydroxide, lithium hydroxide, potassium hydroxide, and ammonium hydroxide are utilized because of their availability and cost. At this stage the finished emulsion typically has a solids content of about 20–40 wt. %. Latices having such solids contents are acceptable for many applications. For example, such latices can be combined with fibers such as Kevlar® aramid fiber in a beater addition process. For most coating applications, however, it is desirable that the latex have a higher solids content because it will then be necessary to evaporate less water when the latex is applied to a substrate to form a film.

Several methods are available to concentrate latices. For example, nonionic surfactants may be added to the emulsion, the mixture then being heated above the cloud point of the surfactant. Phase separation takes place, yielding a concentrated latex and a clear supernatant. In a preferred method, dilute emulsions can be "creamed" to form high solids latices by the addition of certain high molecular weight polymers such as alginates or acrylates, known in the art as creaming agents. Additional surfactants can be added during any of the commonly used concentration processes for the purpose of enhancing the stability of the latex during manufacture or to enhance the storage stability of the final product. Also, additional surfactant may be added after the concentration processes are complete.

The creaming process is the preferred process for concentrating the latices of the present invention. During creaming, high molecular weight species such as alginates or acrylates are added to the fluoroelastomer latex. Typically an alginate, such as the sodium, potassium or ammonium salt, is added in an amount sufficient to cause the composition to separate. This generally occurs within 24 hours. Two layers are formed, a clear supernatant and a solids-rich layer. The clear layer is discarded. The solids-rich fluoroelastomer latex that is the product of this process may be subjected to multiple creaming steps. The creamed latices of the invention exhibit excellent storage stability, i.e., if stirred on a regular basis, non-redispersible sludges do not develop within 6 months.

The latices of the invention may be used as coating compositions for casting films or impregnating substrates such as fabrics, plastics, metal, or elastomers. Specifically, the latices may be used to prepare coated fabrics, protective gloves, impregnated fibers, o-ring coatings, coatings for fuel system quick connect o-rings, coatings for fuel system seals, coatings for fuel tank rollover valve diaphragms, coatings for fuel tank pressure sensor diaphragms, coatings for oil filter and fuel filter seals, coatings for fuel tank sender seals and sender head fitting seals, coatings for copier fuser rolls and polymer coating compositions. The latices are particularly useful for providing protective films over substrates having lower chemical, thermal, or permeation resistance than the protective film and also for the purpose of reducing surface friction of a substrate. They are useful in coating silicone rubber, nitrile rubber and other elastomers. They are also useful in coating parts made from such elastomers, for the purpose of enhancing both the permeation and chemical resistance of the substrate elastomer as well as its thermal stability. Other uses include coatings for heat exchangers, expansion joints, vats, tanks, fans, flue ducts and other ductwork, and containment structures, for example concrete containment structures. The latices may also be applied to the exposed cross sections of multi-layer part construction, for example in hose construction and diaphragm production processes. Sealing elements at joints and couplings often consist of rigid materials and the latices of the invention can provide improved frictional interface, increased dimensional interference fit with reduced microleakage along the sealing surfaces. The latices enhance seal durability in various auto system applications. They may also be used in production of power steering lines, fuel lines, air conditioning lines and any couplings where hoses and tubes are connected to another component. A further utility of the latices is in repair of manufacturing defects (and also damage caused in use) in multi-layer rubber constructions, such as three layer fuel hose. The latices are also useful in coating steel sheets that can be formed or embossed before or after the coating is applied. For example a number of layers of coated steel may be assembled to create a gasket between two rigid metal elements. A sealing effect is obtained by applying latex between the layers. This process can be used to manufacture engine head gaskets and exhaust manifold gaskets for the purpose of reducing bolt force and distortion of assembled parts while providing good fuel economy and low emissions due to low cracking, bending and bore distortion.

Various fluoroelastomer compounding agents, curatives, and other additives may be added to the fluoroelastomer latex to enhance processability or various physical properties, such as tensile strength, modulus, or water resistance. For example, curatives such as amines, bisphenols or peroxides may be used. Examples of suitable amines include species such as triethylenetetramine, hexamethylenediamine, hexamethylenediamine carbamate, and N,N'-dicinnamylidene-1,6-hexanediamine. Fillers can also be added, generally as ball-milled dispersions. Representative examples include dispersions of carbon black, such as MT carbon black; and dispersions of mineral fillers, such as barium sulfate, and various clays. As further examples of additives that may be employed small amounts of fugitive or non-fugitive organic solvents may be utilized to enhance film formation and aminosilanes may be incorporated to enhance adhesion. Compounding and curing formulations are well known to practitioners in this art.

The latices of the present invention have been found to exhibit enhanced water resistance and adhesion compared to other fluoroelastomer latices of the prior art. This is illustrated in the following examples of certain preferred embodiments of the present invention wherein all parts and percentages are by weight unless otherwise stated.

EXAMPLES

Example 1

A continuous emulsion polymerization was carried out in a well-stirred 4.0 liter stainless steel reaction vessel. The reactor was filled with an aqueous solution containing 4.51 g ammonium persulfate and 10.00 g ammonium hydroxide (28–30 wt. % ammonia) per 6 liters of deionized water (Feed A), 2.64 g isopropanol and 6.44 g of Zonyl® UR fluorinated surfactant (added as a solution of Zonyl® UR fluorinated surfactant prepared by dissolving 234 g of the surfactant in 45 g ammonium hydroxide) per 6 liters of deionized water (Feed B). The reaction mixture was heated to 110° C. and Feeds A and B were introduced to the reactor at a rate of 6.0 liters/hour. The reactor was kept liquid-full at a pressure of 6.2 MPa by means of a back-pressure control valve in the effluent line. After 60 minutes, reaction was initiated by introduction of a gaseous mixture consisting of 661 g/hour tetrafluoroethylene (TFE), 1820 g/hour vinylidene fluoride ($VF_2$), and 1253 g/hour hexafluoropropylene (HFP) which was fed through a diaphragm compressor. After equilibration for one hour, effluent fluoroelastomer emulsion was collected for 5 hours. The overall conversion was 94.9 wt. % and the off-gas was 38.0 liters/hour. The effluent fluoroelastomer emulsion composition was separated from residual monomers in a degassing vessel at atmospheric pressure. No foam formed in the degasser. The fluoroelastomer emulsion had a pH of 5.8 and contained 22.9 wt. % solids. A portion of the fluoroelastomer present in the emulsion was isolated and analyzed by Fourier transform infrared analysis. It was found to contain 19.9 wt. % TFE, 50.3 wt. % $VF_2$, and 29.9 wt. % HFP.

The pH of the fluoroelastomer emulsion collected from the reactor was adjusted to 6.3 with an ammonium hydroxide solution consisting of 1 part concentrated ammonium hydroxide per 3 parts water. To each 1000 g emulsion was added 16 g of a 25% solution of Triton® X-100 surfactant in water, and 60 g of a creaming agent consisting of a 1% aqueous solution of Superloid® (ammonium alginate available from The Nutrasweet Kelco Co.). The mixture was permitted to separate into a solids-rich fluoroelastomer latex and a clear supernatant. The supernatant was removed and the resulting fluoroelastomer latex had a solids content of 72.2 wt. %.

Films made by casting latex on a glass plate were transparent and flawless. This latex remained stable for at least six months, with occasional stirring, and continued to provide good films.

Example 2

A sample of the effluent fluoroelastomer emulsion of Example 1 was treated as follows. The pH of the fluoroelastomer emulsion collected from the reactor was adjusted to 6.3 with an ammonium hydroxide solution consisting of 1 part concentrated ammonium hydroxide per 3 parts water. To each 1000 g emulsion was added 32 g of a 25% solution of Triton® X-100 surfactant in water, and 90 g of a creaming agent consisting of 1% aqueous solution of Superloid®. The mixture was permitted to separate into a solids-rich fluoroelastomer latex and a clear supernatant. The supernatant was removed and the resulting fluoroelastomer latex had a solids content of 70.0 wt. %. Films of the latex, made by casting on a glass plate, were transparent and flawless.

Example 3

A continuous emulsion polymerization was conducted in a well-stirred 4.0 liter stainless steel reaction vessel. The reactor was filled with an aqueous solution containing 4.51 g ammonium persulfate and 10.00 g ammonium hydroxide (28–30 wt. % ammonia) per 6 liters of deionized water (Feed A), 2.64 g isopropanol and 10.63 g Zonyl® UR fluorinated surfactant (added as a solution of Zonyl® UR fluorinated surfactant prepared by dissolving 234 g surfactant in 45 g ammonium hydroxide) per 6 liters of deionized water (Feed B). The reaction mixture was heated to 110° C. and Feeds A and B were introduced to the reactor at a rate of 6.0 liters/hour. The reactor was kept liquid-full at a pressure of 6.2 MPa by means of a back-pressure control valve in the effluent line. After 60 minutes, reaction was initiated by introduction of a gaseous mixture consisting of 684 g/hour TFE, 1861 g/hour $VF_2$, and 1287 g/hour HFP which was fed through a diaphragm compressor. After equilibration for one hour, effluent fluoroelastomer emulsion was collected for 5 hours. The overall conversion was 94.7 wt. % and the off-gas was 40.0 liters/hour. The effluent fluoroelastomer emulsion composition was separated from residual monomers in a degassing vessel at atmospheric pressure. No foam formed in the degasser. The fluoroelastomer emulsion had a pH of 6.0 and contained 23.3 wt. % solids. A portion of the fluoroelastomer present in the emulsion was isolated and analyzed by Fourier transform infrared analysis. It was found to contain 20.8 wt. % TFE, 49.5 wt. % $VF_2$, and 29.6 wt. % HFP. The pH of the fluoroelastomer emulsion collected from the reactor was adjusted to 6.3 with an ammonium hydroxide solution consisting of I part concentrated ammonium hydroxide per 3 parts water. To each 1000 g emulsion was added 16 g of a 25% solution of Triton® X-100 surfactant in water, and 60 g of a creaming agent consisting of a 1% aqueous solution of Superloid®. The mixture was permitted to separate into a solids-rich fluoroelastomer latex and a clear supernatant. The supernatant was removed and the resulting fluoroelastomer latex had a solids content of 69.8 wt. %. Films of the latex, made by casting on a glass plate, were transparent and flawless.

Example 4

A continuous emulsion polymerization was conducted in a well-stirred 4.0 liter stainless steel reaction vessel. The reactor was filled with an aqueous solution containing 4.51 g ammonium persulfate and 3.20 g sodium hydroxide per 6 liters of deionized water (Feed A), 2.64 g isopropanol and 6.44 g of a solution of Zonyl® UR fluorinated surfactant (added as a solution of Zonyl® UR fluorinated surfactant prepared by dissolving 234 g surfactant in 40 g 50 wt. % aqueous sodium hydroxide) per 6 liters of deionized water (Feed B). The reaction mixture was heated to 110° C. and Feeds A and B were introduced to the reactor at a rate of 6.0 liters/hour. The reactor was kept liquid-full at 6.2 MPa by means of a back-pressure control valve in the effluent line. After 60 minutes, reaction was initiated by introduction of a gaseous mixture consisting of 624 g/hour TFE, 1663 g/hour $VF_2$, and 1137 g/hour HFP which was led through a diaphragm compressor. After equilibration for one hour, effluent fluoroelastomer emulsion was collected for 5 hours. The overall conversion was 95.3 wt. % and the off-gas was 32.0 liters/hour. The effluent fluoroelastomer emulsion composition was separated from residual monomers in a degassing vessel at atmospheric pressure. A considerable amount of foam was formed in the degasser. The foaming was controlled by addition of 46 ml/hour of D-65 silicone antifoaming agent (available from Dow Coming Corp.) diluted to 25 wt. %. The fluoroelastomer emulsion had a pH of 5.5 and contained 21.5 wt. % solids. A portion of the fluoroelastomer present in the emulsion was isolated and analyzed by Fourier transform infrared analysis. It was found to contain 20.3 wt. % TFE, 49.2 wt. % $VF_2$, and 30.6 wt. % HFP. The pH of the fluoroelastomer emulsion collected from the reactor was adjusted to 6.3 by addition of an ammonium hydroxide solution consisting of 1 part concentrated ammonium hydroxide in 3 parts water. To each 1000 g fluoroelastomer emulsion was added 16 g of a 25% solution of Triton® X-100 surfactant in water, and 60 g of a creaming agent consisting of 1% aqueous solution of Superloid™. The mixture was permitted to separate into a solids-rich fluoroelastomer latex and a clear supernatant. The supernatant was removed and the resulting fluoroelastomer latex had a solids content of 67.7 wt. %. Films of the latex, made by casting on a glass plate, were transparent and flawless.

Example 5

A sample of the effluent fluoroelastomer emulsion of Example 4 was treated as follows. The pH of the fluoroelastomer emulsion collected from the reactor was adjusted to 6.3 with an ammonium hydroxide solution consisting of I part concentrated ammonium hydroxide per 3 parts water. To each 1000 g emulsion was added 32 g of a 25% solution of Triton® X-100 surfactant in water, and 60 g of a creaming agent consisting of 1% aqueous solution of Superloid™. The mixture was permitted to separate into a solids-rich fluoroelastomer latex and a clear supernatant. The supernatant was removed and the resulting fluoroelastomer latex had a solids content of 68.2 wt. %. Films of the latex, made by casting on a glass plate, were transparent and flawless.

Example 6

A continuous emulsion polymerization was conducted in a well-stirred 4.0 liter stainless steel reaction vessel. The reactor was filled with an aqueous solution containing 4.15 g ammonium persulfate and 3.10 g sodium hydroxide per 6 liters of deionized water (Feed A), 2.43 g isopropanol and 6.18 g of Zonyl UR® fluorinated surfactant (added as a solution of Zonyl UR fluorinated surfactant, prepared by dissolving 234 g surfactant in 40 g 50 wt. % aqueous sodium hydroxide) per 6 liters of deionized water (Feed B). The reaction mixture was heated to 110° C. and Feeds A and B were introduced to the reactor at a rate of 6.0 liters/hour. The reactor was kept liquid-full at a pressure of 6.2 MPa by means of a back-pressure control valve in the effluent line. After 60 minutes, reaction was initiated by introduction of a gaseous mixture consisting of 569 g/hour TFE, 1531 g/hour $VF_2$, and 1025 g/hour HFP which was fed through a diaphragm compressor. After equilibration for one hour, effluent fluoroelastomer emulsion was collected for 5 hours. The overall conversion was 95.8 wt. % and the off-gas was 27.0 liters/hour. The effluent fluoroelastomer emulsion composition was separated from residual monomers in a degassing vessel at atmospheric pressure. A considerable amount of foam was formed in the degasser. The foam level was reduced by addition of 60 ml/hour of D-65 anti-foaming agent, diluted to 25 wt %. The fluoroelastomer emulsion had a pH of 5.5 and contained 20.0 wt. % solids. It contained 19.0 wt. % TFE, 50.5 wt. % $VF_2$, and 30.6 wt. % HFP, as determined by mass balance calculation. The fluoroelastomer emulsion collected from the reactor was adjusted to 7.3 by addition of an 0.4 wt % NaOH. To each 1000 g fluoroelastomer emulsion was added 32 g of a 25% solution of Triton® X-100 surfactant in water, and 90 g of a creaming agent consisting of 1% aqueous solution of Superloid™. The mixture was permitted to separate into a solids-rich fluoroelastomer latex and a clear supernatant. The supernatant was removed and the resulting fluoroelastomer latex had a solids content of 69.2 wt. %. Films of the latex, made by casting on a glass plate, were transparent and flawless.

Water swell of films prepared from the fluoroelastomer latex was determined according to the following method. Films were cast on glass plates and permitted to dry at room temperature. The films were weighed and then submerged in water at room temperature for the periods of time noted in Table I. The films were removed from the water, rapidly dried between filter paper, and re-weighed. For comparison, films prepared in the same manner from a commercially available fluoroelastomer latex, Technoflow® TN fluoroelastomer latex (available from Ausimont USA, Inc.) were subjected to the same procedure. Results are shown in Table I.

TABLE I

| Fluoroelastomer Latex Composition | Film Thickness (Mils) | Submersion Time (Hours) | Wt. % Increase |
| --- | --- | --- | --- |
| Example 6 | 17 | 24 | 0.66 |
| Commercial Latex | 18 | 24 | 3.93 |
| Example 6 | 15 | 48 | 0.68[1] |
| Commercial Latex | 19 | 48 | 9.6[1] |
| Example 6 | 17 | 72 | 1.00 |
| Commercial Latex | 18 | 72 | 9.83 |

[1]Average value from two cast films.

TABLE II

| Fluoroelastomer Latex Composition | Film Thickness (Mils) | Submersion Time (Hours) | Wt. % Increase |
| --- | --- | --- | --- |
| Example 7 | 21 | 24 | 0.39 |
| Commercial Latex | 18 | 24 | 3.93 |
| Example 7 | 21 | 48 | 0.58[1] |
| Commercial Latex | 19 | 48 | 9.6[1] |
| Example 7 | 21 | 72 | 0.61 |
| Commercial Latex | 18 | 72 | 9.83 |

[1]Average value of two cast films.

Example 7

A continuous emulsion polymerization was carried out in a well-stirred 4.0 liter stainless steel reaction vessel. The reactor was filled with an aqueous solution containing 3.77 g ammonium persulfate and 11.50 g ammonium hydroxide (28–30 wt. % ammonia) per 6 liters of deionized water (Feed A), 2.21 g isopropanol and 9.00 g Zonyl UR® fluorinated surfactant (added as a solution of Zonyl UR fluorinated surfactant in ammonium hydroxide, prepared by dissolving 234 g surfactant in 45 g ammonium hydroxide) per 6 liters of deionized water (Feed B). The reaction mixture was heated to 110° C. and Feeds A and B were introduced to the reactor at a rate of 6.0 liters/hour. The reactor was kept liquid-full at a pressure of 6.2 MPa by means of a back-pressure control valve in the effluent line. After 60 minutes, reaction was initiated by introduction of a gaseous mixture consisting of 589 g/hour TFE, 1580 g/hour $VF_2$, and 1080 g/hour HFP which was fed through a diaphragm compressor. After equilibration for one hour, effluent fluoroelastomer emulsion was collected for 5 hours. The overall conversion was 93.2 wt. % and the off-gas was 35.5 liters/hour. The effluent fluoroelastomer emulsion composition was separated from residual monomers in a degassing vessel at atmospheric pressure. No foam formed in the degasser. The fluoroelastomer emulsion had a pH of 6.3 and contained 20.3 wt. % solids. The composition of the polymer was calculated by mass balance to be 19.3 wt. % TFE, 50.8 wt. % $VF_2$, and 29.9 wt. % HFP. The pH of the fluoroelastomer emulsion collected from the reactor was adjusted to 8.0 with an ammonium hydroxide solution consisting of 1 part concentrated ammonium hydroxide per 3 parts water. To each 1000 g emulsion was added 32 g of a 25% solution of Triton® X-100 surfactant in water, and 90 g of a creaming agent consisting of 1% aqueous solution of Superloid™. The mixture was permitted to separate into a solids-rich fluoroelastomer latex and a clear supernatant. The supernatant was removed and the resulting fluoroelastomer latex had a solids content of 70.2 wt. %. Films made by casting latex on a glass plate were transparent and flawless.

Films of the Example 7 fluoroelastomer latex composition were tested for water swell using the method described in Example 6. For comparison, films prepared in the same manner from a commercially available fluoroelastomer latex, Technoflow® TN fluoroelastomer latex, available from Ausimont USA, Inc.) were subjected to the same procedure. Results are shown in Table II.

What is claimed is:

1. A process for preparation of a fluoroelastomer latex which comprises the steps of:

A) forming an aqueous emulsion of monomers capable of being copolymerized to form a fluoroelastomer, said emulsion comprising 1) a first monomer selected from the group consisting of vinylidene fluoride and tetrafluoroethylene;

2) at least one other fluorine-containing monomer;

3) a free radical initiator in an amount which catalyzes the free radical emulsion polymerization of said monomers;

4) from about 0.05–3.0 parts by weight per hundred parts monomer of a fluorinated surfactant; and 5) sufficient base to adjust the pH of said emulsion to between 5 to 8;

B) polymerizing said emulsion at a temperature of about 40°–130° C. and a pressure of about 2–9 MPa to form a fluoroelastomer emulsion composition;

C) adding a sufficient amount of base to adjust the pH of said fluoroelastomer emulsion composition to between 5–9; and D) concentrating said fluoroelastomer emulsion composition which has a pH of 5–9 to form a solids-rich fluoroelastomer latex.

2. The process of claim 1 wherein the aqueous emulsion is formed from a first monomer which is vinylidene fluoride and at least one other fluorine-containing monomer.

3. The process of claim 1 wherein the aqueous emulsion is formed from a first monomer which is tetrafluoroethylene and at least one other fluorine-containing monomer.

4. The process of claim 2 wherein the aqueous emulsion is formed from monomers comprising vinylidene fluoride, tetrafluoroethylene, and hexafluoropropylene.

5. The process of claim 1 further comprising adding a second surfactant to the fluoroelastomer emulsion composition formed in step C) having a pH of 5 to 9 prior to concentrating said fluoroelastomer emulsion composition.

6. The process of claim 1 wherein the fluoroelastomer emulsion composition is concentrated in step D) by adding a sufficient amount of creaming agent so as to cause said composition to separate into two layers, a clear supernatant and a solids-rich fluoroelastomer latex and removing the supernatant from the solids-rich fluoroelastomer latex.

7. The process of claim 1 further comprising adding a second surfactant to the solids-rich fluoroelastomer latex formed in step D).

8. A process for preparation of a fluoroelastomer latex which comprises the steps of:

A) forming an aqueous emulsion of monomers capable of being copolymerized to form a fluoroelastomer, said emulsion comprising 1) tetrafluoroethylene;
2) an olefin;
3) a free radical initiator in an amount which catalyzes the free radical emulsion polymerization of the monomers;
4) from about 0.05–3.0 parts by weight per hundred parts monomer of a fluorinated surfactant; and
5) sufficient base to adjust the pH of said emulsion to between 5 to 8;

B) polymerizing said emulsion at a temperature of about 40°–130° C. and a pressure of about 2–9 MPa to form a fluoroelastomer emulsion composition;

C) adding a sufficient amount of base to adjust the pH of said fluoroelastomer emulsion composition to between 5–9; and D) concentrating said fluoroelastomer emulsion composition which has a pH of 5–9 to form a solids-rich fluoroelastomer latex.

9. The process of claim 1 wherein the monomers in the emulsion capable of being copolymerized into a fluoroelastomer comprise tetrafluoroethylene and a perfluorinated vinyl ether.

* * * * *